United States Patent
Asawa et al.

(10) Patent No.: US 7,372,843 B1
(45) Date of Patent: May 13, 2008

(54) SYSTEM AND METHOD FOR COMPRESSING INFORMATION FLOWS IN A NETWORK ENVIRONMENT

(75) Inventors: Manjari Asawa, Cupertino, CA (US); Tmima Koren, Cupertino, CA (US); Walter L. Robinson, Raleigh, NC (US); Malcolm M. Smith, Calgary (CA)

(73) Assignee: Cisco Technology, Inc., San Jose, CA (US)

( * ) Notice: Subject to any disclaimer, the term of this patent is extended or adjusted under 35 U.S.C. 154(b) by 805 days.

(21) Appl. No.: 10/669,021

(22) Filed: Sep. 23, 2003

(51) Int. Cl.
*H04B 7/212* (2006.01)
(52) U.S. Cl. .................. 370/349; 370/469; 370/352
(58) Field of Classification Search ................. 370/349
See application file for complete search history.

(56) References Cited

U.S. PATENT DOCUMENTS

| | | | |
|---|---|---|---|
| 5,894,557 A | 4/1999 | Bade et al. ............ 395/200.58 |
| 6,134,245 A | 10/2000 | Scarmalis ................. 370/474 |
| 6,192,051 B1 | 2/2001 | Lipman et al. ............. 370/389 |
| 6,363,065 B1 | 3/2002 | Thornton et al. ........... 370/352 |
| 6,400,722 B1 | 6/2002 | Chuah et al. ............... 370/401 |
| 6,477,595 B1 | 11/2002 | Cohen et al. ............... 710/105 |
| 6,512,754 B2 | 1/2003 | Feder et al. ................ 370/338 |
| 6,512,773 B1 | 1/2003 | Scott ..................... 370/395.61 |
| 6,697,354 B1* | 2/2004 | Borella et al. ............. 370/352 |
| 6,751,207 B1* | 6/2004 | Lee et al. ................... 370/338 |
| 2002/0146000 A1* | 10/2002 | Jonsson et al. ............ 370/352 |
| 2003/0076815 A1* | 4/2003 | Miller et al. ................ 370/352 |
| 2004/0071148 A1* | 4/2004 | Ozaki et al. ................ 370/401 |
| 2004/0264433 A1* | 12/2004 | Melpignano ............... 370/349 |

\* cited by examiner

*Primary Examiner*—Rafael Perez-Gutierrez
*Assistant Examiner*—Kwasi Karikari
(74) *Attorney, Agent, or Firm*—Baker Botts L.L.P.

(57) ABSTRACT

A method for compressing data is provided that includes receiving a communications flow communicated by a mobile station and communicating with a proxy element in order to determine if an incoming packet is associated with an internet protocol (IP). The method also includes performing a mapping between a non-IP based protocol associated with the incoming packet and an IP protocol in cases where the incoming packet is non-IP based in order to generate an IP compatible packet to be processed by a forwarding path element and communicated to a next destination.

27 Claims, 3 Drawing Sheets

FIG. 1

SYSTEM AND METHOD FOR COMPRESSING INFORMATION FLOWS IN A NETWORK ENVIRONMENT

TECHNICAL FIELD OF THE INVENTION

The present invention relates in general to the field of network communications and, more particularly, to a system and method for compressing information flows in a network environment.

BACKGROUND OF THE INVENTION

Communication systems and architecture have become increasingly important in today's society. One aspect of communications relates to maximizing bandwidth and minimizing delays associated with data and information exchanges. Some radio access network (RAN) products may focus on the transport of traffic from the cell site, where the base transceiver station is located, to the central office (CO) site, where the base station controller is located. These RAN products may implement inadequate compression techniques, as significant delays are generally incurred and optimal bandwidth allocations may not be realized. Such products may also be inflexible in targeting (or operating effectively with) certain types of data propagating along particular communication links. Other types of data are simply not accounted for or discarded, whereby network components are unable to process the communication flows.

Additionally, most proposed solutions for effectuating proper data and information exchanges add significant overhead and cost in order to achieve efficiency. For example, T1/E1 lines are generally expensive and, thus, should be maximized in order to achieve favorable system performance. Accordingly, the ability to provide a communication system that consumes few resources, accommodates diverse communication flows, and achieves minimal delay presents a significant challenge for network designers and system administrators.

SUMMARY OF THE INVENTION

From the foregoing, it may be appreciated by those skilled in the art that a need has arisen for an improved compression approach that optimizes data exchanges in a communications environment. In accordance with one embodiment of the present invention, a system and method for compressing information flows in a network environment are provided that substantially eliminate or greatly reduce disadvantages and problems associated with conventional compression techniques.

According to one embodiment of the present invention, there is provided a system for compressing data that includes receiving a communications flow communicated by a mobile station and communicating with a proxy element in order to determine if an incoming packet is associated with an internet protocol (IP). The method also includes performing a mapping between a non-IP based protocol associated with the incoming packet and an IP protocol in cases where the incoming packet is non-IP based in order to generate an IP compatible packet to be processed by a forwarding path element and communicated to a next destination.

Certain embodiments of the present invention may provide a number of technical advantages. For example, according to one embodiment of the present invention, a communications approach is provided that includes an architecture that is more efficient in processing a given packet in the network. This is due, in part, to the fact that the end-point of IP communications is not the main processor (e.g. a route processor) that hosts a gateway application, and therefore IP processing capabilities of a forwarding path (or fast path) element or card (e.g. routing, quality of service, etc.) can be used. This feature may improve capacity characteristics of the cell site element or aggregation node. This improvement may also allow for additional end users and/or greater amounts of information to be accommodated in the network.

Another technical advantage of one embodiment of the present invention is that the provided communications approach significantly enhances adaptability and bandwidth parameters for a given architecture. This is a result of a compression technique that allows for the integration of multiple protocols at both the cell site router and aggregation node within the network. Thus, both of these elements may accommodate diverse communication flows, without having to significantly affect or alter flows. This further allows a base transceiver station and a base station controller to effectively operate in conjunction with multiple communication protocols without having to be significantly modified or substantially reconfigured.

Yet another technical advantage associated with one embodiment of the present invention relates to its flexibility. The compression approach provided may be leveraged in order to cooperate with other features of an IP architecture. For example, the compression approach offered by the present invention may be used in cooperation with quality of service, routing, priority, and security characteristics. This allows two systems to be integrated such that the benefits of one system can be realized and delivered to an end user without a significant overhaul in the corresponding network architecture. This may save considerable time and effort on the part of any network designer or system operator, as two communication protocols are suitably accommodated in the network. Certain embodiments of the present invention may enjoy some, all, or none of these advantages. Other technical advantages may be readily apparent to one skilled in the art from the following figures, description, and claims.

BRIEF DESCRIPTION OF THE DRAWINGS

For a more complete understanding of the present invention and the advantages thereof, reference is made to the following description taken in conjunction with the accompanying drawings, wherein like reference numerals represent like parts, in which.

DETAILED DESCRIPTION OF THE INVENTION

Figure 1:
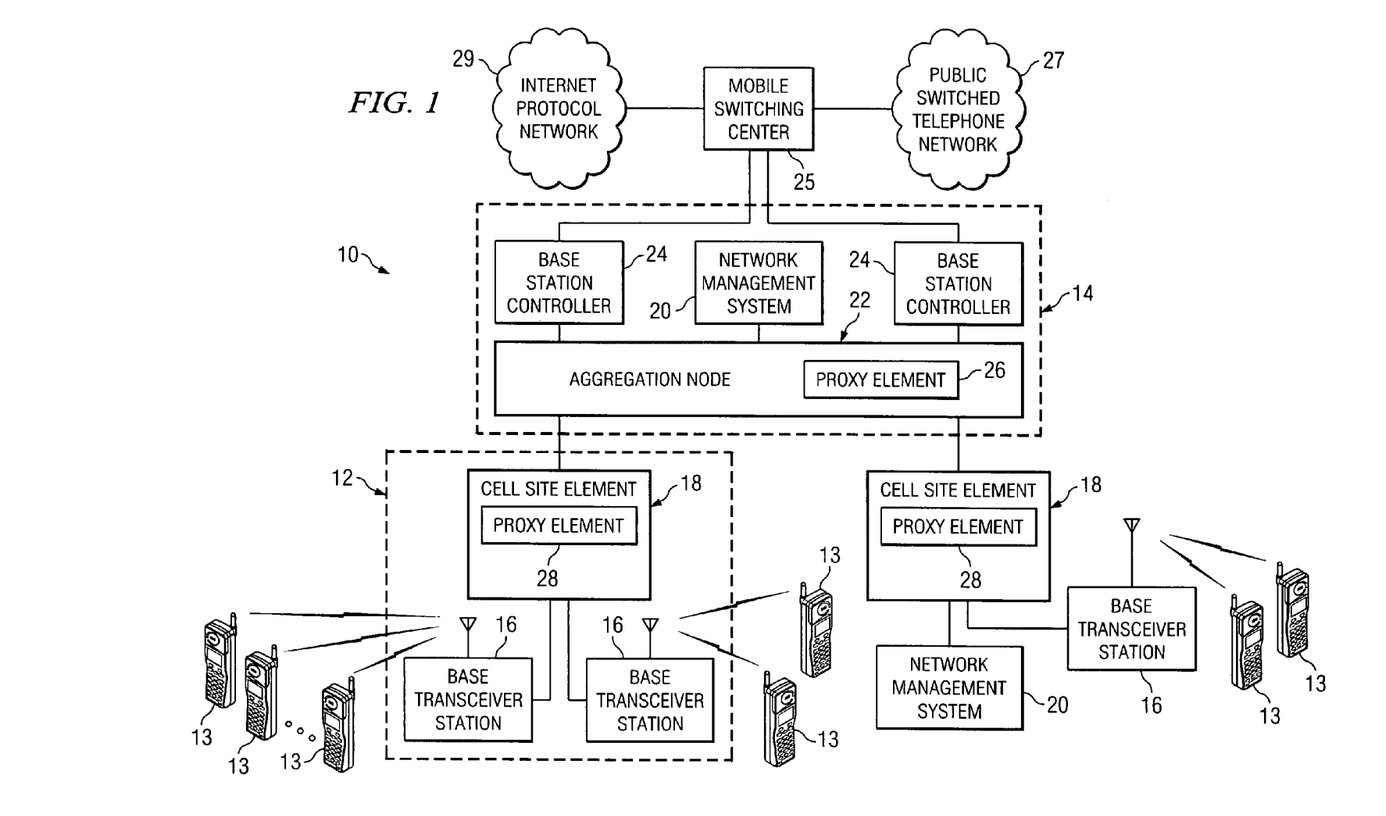
FIG. 1 is a simplified block diagram of a communication system for compressing data.

FIG. 1 is a simplified block diagram of a communication system 10 for compressing data in a communications environment. Communication system 10 may include a plurality of cell sites 12, a plurality of mobile stations 13, a central office site 14, a plurality of base transceiver stations 16, a plurality of cell site elements 18, and a network management system 20. Additionally, communication system 10 may include an aggregation node 22, a plurality of base station controllers 24, a mobile switching center 25, a public switched telephone network (PSTN) 27, and an internet protocol (IP) network 29. Aggregation node 22 may include a proxy element 26, whereby cell site elements 18 may be provided with corresponding proxy elements 28, which may facilitate certain communications between aggregation node 22 and one or more cell site elements 18.

Communication system 10 may generally be configured or arranged to represent a 2.5G architecture applicable to a Global System for Mobile (GSM) environment in accordance with a particular embodiment of the present invention. However, the 2.5G architecture is offered for purposes of example only and may alternatively be substituted with any suitable networking system or arrangement (e.g. first generation, 2G, etc.) that provides a communicative platform for communication system 10. For example, the present invention may be used in conjunction with a 3G network, where 3G equivalent networking equipment is provided in the architecture. Communication system 10 is versatile in that it may be used in a host of communication environments such as in conjunction with any code-division or time-division multiple access (CDMA or TDMA) element or protocol for example.

In accordance with the teachings of the present invention, a compression approach is provided that integrates diverse communication flows in a network by using a proxying approach that utilizes proxy elements 26 and 28. Communication system 10 provides an architecture in which cell site element 18 and/or aggregation node 22 implements compression protocols in order to leverage one or more existing technologies such that data exchanges (e.g. phone calls) may be effectively transmitted on backhaul lines. Bits may be taken that are associated with the calls and compressed in order to reduce the T1/E1 allocations or time slots being implemented for a given number of GSM phone calls on the backhaul.

One method of leveraging existing network capabilities and features involves the architecture of cell site element 18 and aggregation node 22. In accordance with one embodiment of the present invention, the features of proxy elements 26 and 28 (in potential cooperation with interrupt service routines (ISR) of the media interface and a fast path or forwarding path (both of which may be abbreviated as 'FP' and used interchangeably herein in this document) command queue) provide a mapping function to be easily performed between an IP and a non-IP based frame protocol. This may additionally allow for the effective use of the IP-based hardware-acceleration engine (e.g. FP). In this general sense, non-IP based protocols are efficiently processed by IP-based hardware-acceleration engines by using proxying techniques offered by communication system 10.

Such proxying operations may result in the architecture provided by communication system 10 being generally more efficient in processing a given packet in the network. Because the end-point of IP communications is not the main processor (e.g. a route processor) that hosts a gateway application, IP processing capabilities of a forward path (or fast path) chip, element, or card can be used to improve capacity characteristics of cell site element 18 and/or aggregation node 22. This improvement allows for additional end users or greater amounts of information to be accommodated in the network. Note that the end-point of the IP communication may be the IP interface associated with proxy element 26.

Additionally, communication system 10 may minimize delays associated with other conversion approaches and, additionally, reduce costs associated with T1/E1 lines that would otherwise be needed to facilitate additional data exchanges. Delays are effectively decreased as a result of cell site element 18 or aggregation node 22 being capable of accommodating multiple protocols in an optimal fashion. Communication system 10 also offers a communications approach that significantly enhances adaptability parameters for a given architecture. This is a result of a compression technique that allows for the integration of multiple protocols at both cell site element 18 and aggregation node 22 within the network. Thus, both of these elements may accommodate diverse communication flows, without having to be significantly altered.

In order to leverage an existing IP radio access network (RAN) architecture, a high-level data link control multiplex (HDLCmux) protocol may be implemented in a way that leverages the existing (potentially compressed) user datagram protocol (UDP) (CUDP) and/or point to point protocol (PPP) multiplexing (PPPmux). The leveraging may be accomplished in a number of ways. One method may include converting each radio access bearer (RAB) flow from the base transceiver station/base station controller (BTS/BSC) (i.e. HDLC/BSC flow) into a set of one or more UDP/IP flows. In executing this operation, the resulting UDP/IP flows can be compressed by an existing cUDP/PPPmux protocol stack of the IP-RAN. With this scheme, traffic frames from the HDLC-based interface are converted to UDP/IP packets by a compression element or module. The IP packets are then forwarded to the peer compression element or module on another IP router in the IP network. The peer compression module may convert the UDP/IP packets back into traffic frames on the HDLC-based interface. Thus, a mapping function is defined between an HDLC/base station communications network (BCN) flow frame and a UDP/IP packet. In a general sense, communication system 10 achieves an optimum integration/accommodation of communications flows with use of an effective compression and conversion approach. Thus, HDLC compression may be realized by tunneling HDLC over standard UDP/IP protocols and existing IP-RAN compression technology.

The compression approach of communication system 10 may also be leveraged in order to cooperate with other features of an IP architecture. For example, the compression approach offered by communication system 10 may be used in cooperation with quality of service, routing, priority, security characteristics, and any other suitable parameters, features, services, or functions. This further allows two systems to be integrated such that the benefits of one system can be realized and delivered to an end user without a significant overhaul of existing network equipment. This may save considerable time, money, and effort on the part of any network designer or system operator. Modifications to both cell site element 18 and aggregation node 22 may be implemented in order to achieve such results. Additional details relating to cell site element 18 and aggregation node 22 are provided below with reference to FIG. 2.

Communication system 10 offers an efficient and scalable implementation of the HDLCoPPPmux compression protocol (and similar protocols) that utilize a gateway to convert between open system interconnection (OSI) based interfaces (e.g. UDP/IP/PPP) and non-OSI proprietary protocols (e.g. 2G CDMA A-bis interface). A number of existing network elements may provide a hardware-acceleration engine that efficiently processes IP-based traffic. The engines may perform fast-switching, routing, quality of service, compression and other appropriate features that are computationally expensive to perform in a general computing environment.

Such an approach may work for its intended purpose when the traffic is IP-based and the communication end-points have IP addresses. However, protocols that are not IP-based cannot be processed by the hardware-acceleration engines, resulting in the inhibition of scalability and density. Communication system 10 addresses this issue (and others) and allows non-IP based protocols to be efficiently processed by IP-based hardware (or software) acceleration engines.

Mobile station 13 is an entity, such as a client, subscriber, end user, or customer that seeks to initiate a communication session or data exchange in communication system 10 via any suitable network. Mobile station 13 may operate to use any suitable device for communications in communication system 10. Mobile station 13 may further represent a communications interface for an end user of communication system 10. Mobile station 13 may be a cellular or other wireless telephone, an electronic notebook, a computer, a personal digital assistant (PDA), or any other device, component, or object capable of initiating a data exchange facilitated by communication system 10. Mobile station 13 may also be inclusive of any suitable interface to the human user or to a computer, such as a display, microphone, keyboard, or other terminal equipment (such as for example an interface to a personal computer or to a facsimile machine in cases where mobile station 13 is used as a modem). Mobile station 13 may alternatively be any device or object that seeks to initiate a communication on behalf of another entity or element, such as a program, a database, or any other component, device, element, or object capable of initiating a voice or a data exchange within communication system 10. Data, as used herein in this document, refers to any type of numeric, voice, video, audio-visual, or script data, or any type of source or object code, or any other suitable information in any appropriate format that may be communicated from one point to another.

Base transceiver stations 16 are communicative interfaces that may comprise radio transmission/reception devices, components, or objects, and antennas. Base transceiver stations 16 may be coupled to any communications device or element, such as mobile station 13 for example. Base transceiver stations 16 may also be coupled to base station controllers 24 (via one or more intermediate elements) that use a landline (such as a T1/E1 line, for example or in wireless applications a microwave or satellite T-1) interface. Base transceiver stations 16 may operate as a series of complex radio modems where appropriate. Base transceiver stations 16 may also perform transcoding and rate adaptation functions in accordance with particular needs. Transcoding and rate adaptation may also be executed in a GSM environment in suitable hardware or software (for example in a transcoding and rate adaptation unit (TRAU)) positioned between mobile switching center 25 and base station controllers 24.

In operation, communication system 10 may include multiple cell sites 12 that communicate with mobile stations 13 using base transceiver stations 16 and cell site element 18. Central office site 14 may use aggregation node 22 and base station controllers 24 for communicating with cell site 12. One or more network management systems 20 may be coupled to either cell site 12 and central office site 14 (or both as desired), whereby mobile switching center 25 provides an interface between base station controllers 24 (of central office site 14) and PSTN 27, IP network 29, and/or any other suitable communication network. Base transceiver stations 16 may be coupled to cell site element 18 by a T1/E1 line or any other suitable communication link or element operable to facilitate data exchanges. A backhaul connection between cell site element 18 and aggregation node 22 may also include a T1/E1 line or any suitable communication link where appropriate and in accordance with particular needs.

Base station controllers 24 generally operate as management components for a radio interface. This may be done through remote commands to a corresponding base transceiver station within a mobile network. One base station controller 24 may manage more than one base transceiver station 16. Some of the responsibilities of base station controllers 24 may include management of radio channels and assisting in handover scenarios. In operation of a generic example, layer-one based (e.g. time-division multiplexed (TDM), GSM, etc.) or layer-two based (e.g. Frame Relay, HDLC, asynchronous transfer mode (ATM), point to point protocol (PPP) over HDLC) traffic may be communicated by each base transceiver station 16 to cell site element 18 of cell site 12. Cell site element 18 may also receive IP or Ethernet traffic from network management system 20. Cell site element 18 may multiplex payloads from the traffic that has a common destination. The multiplexed payloads, as well as any payloads extracted from the network management system IP or Ethernet traffic, may be communicated across a link to aggregation node 22 within central office site 14.

Aggregation node 22 may demultiplex the payloads for delivery to an appropriate base station controller 24 or network management system 20. Note that network management system 20 could be any other suitable type of IP BTS element or access point (AP) where appropriate (e.g. IEEE 802.11, 802.16, 802.20, etc.) and in accordance with particular communication needs.

Mobile switching center 25 operates as an interface between PSTN 27 and base station controllers 24, and potentially between multiple other mobile switching centers in a network and base station controller 24. Mobile switching center 25 represents a location that generally houses communication switches and computers and ensures that its cell sites in a given geographical area are properly connected. Cell sites refer generally to the transmission and reception equipment or components that connect elements, such as mobile station 13, to a network, such as IP network 29 for example. By controlling transmission power and radio frequencies, mobile switching center 25 may monitor the movement and the transfer of a wireless communication from one cell to another cell and from one frequency or channel to another frequency or channel. In a given communication environment, communication system 10 may include multiple mobile switching centers 25 that are operable to facilitate communications between base station controller 24 and PSTN 27. Mobile switching center 25 may also generally handle connection, tracking, status, billing information, and other suitable user information for communications in a designated area.

PSTN 27 represents a worldwide telephone system that is operable to conduct communications. PSTN 27 may be any land line network operable to facilitate communications between two entities, such as two persons, a person and a computer, two computers, or in any other environment in which data is exchanged for purposes of communication. According to one embodiment of the present invention, PSTN 27 operates in a wireless domain, facilitating data exchanges between mobile station 13 and any other suitable entity within or external to communication system 10.

IP network 29 is a series of points or nodes of interconnected communication paths for receiving and transmitting packets of information that propagate through communication system 10. Note that IP network 29 may be coupled to a PDSN positioned between BSC 24 and itself. IP network 29 offers a communications interface between mobile stations 13 and any other suitable network equipment. IP network 29 may be any local area network (LAN), metropolitan area network (MAN), wide area network (WAN), virtual private network (VPN), wireless local area network (WLAN), or any other appropriate architectural system that facilitates communications in a network environment. IP network 29 implements a transmission control protocol/internet protocol (TCP/IP) communication language protocol in a particular embodiment of the present invention. However, IP network 29 may alternatively implement any other suitable communications protocol for transmitting and receiving data packets within communication system 10.

In operation of an example embodiment, the compression technique of communication system 10 may free up as much mapping space as possible in the UDP/IP headers. One or more of the following assumptions may be made: 1) the IP network (and IP routers) support IP version four (IPv4) or IP version six (IPv6), or the IP network can tunnel IPv4 over Ipv6; 2) the IP network (and IP routers) between the compression element or module do not use source-based routing (i.e. the IP source address is not necessarily used in certain forwarding decisions); 3) the IP network (and IP routers) do not use layer four (UDP) filtering or port-based routing decisions; and 4) the compression modules are provisioned with the destination IP address for traffic that is received from a particular HDLC interface. This may effectively establish a tunnel between the BTS and BSC. With these simplifications, one or more of the following UDP/IP fields may be used by the mapping function: 1) IP source; 2) UDP source port; and 3) UDP destination port.

The mapping function may take a RAB flow (which in the case of a 2G CDMA system may be an HDLC/BCN flow) and convert it into multiple UDP/IP flows. The UDP/IP fields may be derived as follows: IP source: =FLOW+ (COS<<24)+(PT<<28) UDP src port: =ADDR+ (CTRL<<8). The remaining IP/UDP header fields may be set to reasonable values for the IP environment (e.g. TOD/DSCP field set to EF). The HDLC flag and cyclic redundancy check (CRC) fields may be discarded (and subsequently re-created by a decompressor module), while the remaining HDLC header fields (SEQ and MISC) may be pre-pended to the payload field, which together form the UDP data (payload) field.

The resulting UDP/IP packet may be transmitted by a router (e.g. cell site element 18) using any required IP forwarding techniques to get the packet to the back-haul PPP interface. The PPP-layer compression protocols (cUDP, PPPmux) may then be used on this PPP interface to reduce the UDP/IP headers to two or three bytes in aggregating multiple packets into one larger PPPmux packet. The router (e.g. aggregation node 22) on the other end of the backhaul interface may de-multiplex and de-compress the data in order to extract the original UDP/IP packet, which may then be routed to the receiving interface using any selected IP forwarding techniques. Based on the IP destination address, the packet is delivered to the compression module. The compression module may perform the reverse mapping (as described above) delivering a reconstituted HDLC frame. This HDLC frame may then be transmitted on the interface to the BTS/BSC.

Figure 2:
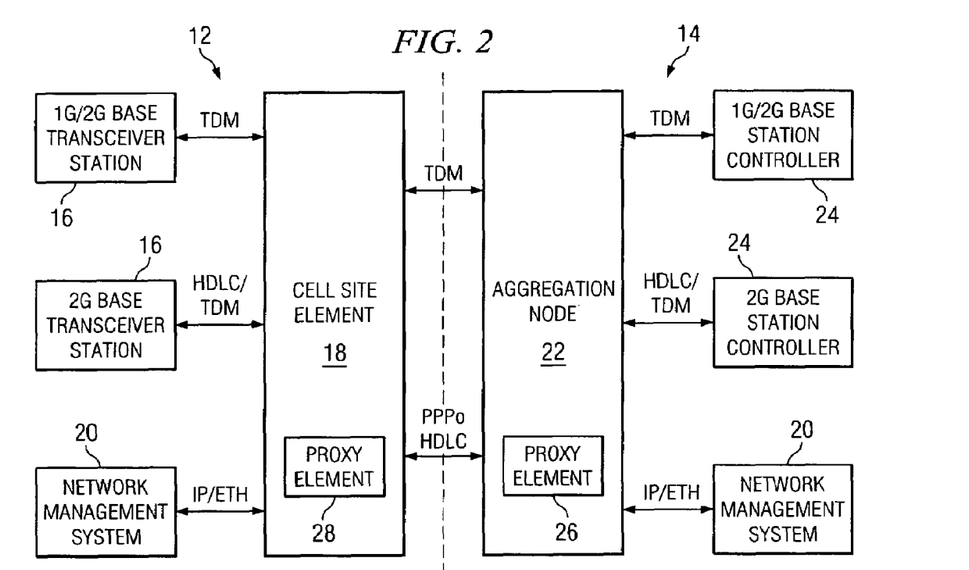
FIG. 2 is a simplified block diagram of an example traffic flow in the communication system.

FIG. 2 is a simplified block diagram that shows an example traffic flow in communication system 10. For discussion purposes only, a specific layer-two based approach is presented; however, other suitable types of layer-one, two, or three based protocols may be used herein with equal effectiveness. The transport of the sub-frames over the packet back-haul can be a layer-two based architecture, but also could be any other suitable layer based implementation such as a layer four-based implementation. The layer-two based approach is a compression scheme that allows existing packet-based backhaul transport protocols to be integrated with (and efficiently carried over) an IP-based backhaul transport mechanism. In a simplest case, offered for purposes of example only, the source link (e.g. T1) contains GSM frames containing voice, data, control, or O&M traffic.

Each aggregation node 22 or cell site element 18 may include any suitable elements that facilitate their operations. For example, each of aggregation node 22 and cell site element 18 may include elements such as a framer, a time-switch element, and a forwarder. Additionally, aggregation node 22 and cell site element 18 may be provided with a hardware-acceleration engine and include one or more of the following: 1) a main route processor (RP); 2) a media interface (HDLC, Ethernet, etc.); 3) an interrupt interface from the media interface to the RP; 4) a co-processing chip (e.g. Intel X-Scale processor array) for fast-path or forwarding path [FP] processing; 5) a bi-directional co-processor work queue (which could be in shared memory); 6) a shared memory (e.g. synchronous dynamic random access memory (SDRAM)) between RP, FP, and media interfaces; and 7) a shared memory data-bus (e.g. PCI). The FP typically has limited amounts of internal memory (e.g. pipeline cache) and can be designed to operate with as few interface devices as possible and to perform a limited number of repetitive tasks on each frame (from a limited set of layer-two protocols). The route processor (RP) (which [comparatively] includes an abundance of memory) may be programmed to address the multitude of specific interface devices available on a routing platform and pass the frames to the FP in a generic format. This may translate into the FP only knowing how to physically and logically interface with the RP, whereby it does not need to know how to interface with the myriad of communications devices available (e.g. serial, synchronous, bus, etc).

In accordance with one embodiment, proxy elements 26 and 28 represent software to be included within a given RP of aggregation node 22 and cell site element 18. Alternatively, proxy elements 26 and 28 may be provided in hardware or in any other suitable element, component, module, device, or object facilitating the operations proxy elements 26 and 28. Proxy elements 26 and 28 may operate as peers in transmitting and receiving packets of information propagating through the network. Additionally, proxy elements 26 and 28 may each represent two or more proxy peers that may interface with each other within cell site element 18 and within aggregation node 22. For example, proxy elements 26 and 28 may include several ancillary components that are provided as interfaces to elements such as a media interface, a work queue, a memory element, or an FP module and/or component. This would allow proxying operations to be integrated with each of the operations to be performed by the components that are internal to cell site element 18 or aggregation node 22. Moreover, proxy elements 26 and 28 may be provided external to aggregation node 22 and cell site element 18 in alternative embodiments.

In operation, aggregation node 22 and cell site element 18 may perform similar compression and data management techniques. Each of these elements may include any suitable hardware, software, object, or element operable to perform one or more of their functionalities (e.g. compression, decompression, multiplexing, demultiplexing, etc.). Additionally, such elements may be inclusive of suitable algorithms that operate to distribute data properly in a communications environment. For example, appropriate algorithms and software may be used in order to identify the type of signal (or information associated with the signal or link) being communicated between base transceiver station 18 and base station controller 24.

The flow of an IP-packet in a generic routing scenario (used as a context in describing some of the operations of cell site element 18 and aggregation node 22) may be as follows:

1) interface (Ethernet, HDLC) delineates a layer-one or a layer-two frame and places it into shared memory (e.g. via a data-bus) and signals an interrupt to the RP to check this interface for new frames;

2) RP receives pointer to new frame by reading media interface control registers;

3) RP performs post-reception functions on frame (e.g. accounting) and determines if it can be processed by the FP. If it can, it schedules the frame for processing by adding the frame to the FP command queue;

4) FP card or chip receives frame (by extracting pointer from command queue entry) and performs any processing required (e.g. de-compression) in order to recover the IP address of the packet;

5) FP card or chip determines the output interface (e.g. using an IP routing database) and performs any output processing (e.g. compression, layer-two header addition) appropriate for that interface protocol (e.g. PPP, Frame Relay, ATM);

6) FP card or chip passes the layer-two frame back to the RP by adding an entry to the control queue;

7) FP card or chip performs pre-transmission processing (e.g. accounting) and then adds the frame to the queue for the output media interface device (in the interrupt handler for the FP/RP command queue); and 8) the output media interface takes the frame and transmits it on the media (e.g. HDLC, Ethernet).

In the IP-packet to non-IP packet direction, the same process may be applied only in reverse. As can be inferred from the steps above, the FP card or chip can be used to accelerate the processing capability of the router if an IP destination address is associated with the packet or frame.

In the case of non-IP based protocols, certain protocols (e.g. HDLC/BCN) originate from end-devices (e.g. 2G CDMA BTS) that do not have IP (or any other form of network) addresses associated with them. In a generic gateway or proxy implementation, this would be addressed by associating IP addresses with a process (potentially being executed on the FP card or chip) that can communicate with both the IP-based network and the non-IP based device. However, the frames to/from this non-IP interface may be intercepted by the RP (from the media interface) and not processed by the FP card or chip, resulting in a degradation in capacity with respect to normal IP-based traffic.

In order to use the processing power of the IP-based FP card or chip for the non-IP based packets, the following changes may be made to the work-flow as follows. With regard to Step (3), the RP (interrupt handler for the media device) may determine if this is a non-IP based protocol. If so, proxy element 28 is called upon to perform a mapping of the non-IP based protocol (e.g. HDLC/BCN-based A-bis as in 2G CDMA BTSs). This mapping may add one or more of a PPP, an IP, and a UDP header to the frame, as well as mapping some of the fields in the non-IP frame to fields of the UDP/IP header (which may result in effective header compression of the non-IP frame). The IP destination address may be chosen such that it is a valid IP address for the IP network that cell site element 18 is connected to and results in the delivery of the packet to an IP interface that has a corresponding proxy element or peer. The frame may be modified directly in shared memory (not necessarily copied into RP memory) and then its pointer may be added to the command queue for the FP.

With regard to Step (4), because the packet has been converted to PPP (a known layer-two protocol for IP and supported on IP-based hardware-acceleration engines), the FP card or chip may treat the packet as any other IP packet and route it to the peer proxy element interface using IP addressing and routing rules. With regard to step (7), if the output interface is not IP, a proxy peer may be engaged. This is a peer of the proxy element in the sending network equipment (e.g. cell site element 18). Proxy element 28 may map the IP/UDP header to fields in the non-IP frame (possibly uncompressing the non-IP frame protocol) and remove the PPP/IP/UDP header from the frame before passing it to the media interface. Thus, the features of proxy element 28 (in cooperation with the interrupt service routines (ISR) of the media interface and FP command queue), provide a mapping to be easily performed between an IP and a non-IP based frame protocol. This may additionally allow for the effective use of the IP-based hardware-acceleration engine (i.e. the FP). In this general sense, non-IP based protocols are efficiently processed by IP-based hardware-acceleration engines by using proxying techniques offered by communication system 10. Thus, communication system 10 allows the ability to leverage a network element (e.g. a router) that uses a hardware-acceleration engine. In general, the functionality of the fast path or forwarding path processor (i.e. the FP), which represents the hardware-acceleration engine that optimizes the IP compression and IP routing functions, is utilized to its fullest capabilities.

In operation of an example embodiment that represents a potential flow in a network, once a packet is received from the HDLC interface (e.g. from the BTS), a framer may be used to delineate the HDLC frames from each other (each of the frames being separated by flags). This may be placed into a shared memory buffer (e.g. RAM or a suitable data bus). The RP or main processor, which is responsible for coordination of routing and traffic functions, may receive the packet and forward it to the appropriate media interface (or to a hardware-acceleration engine). The RP immediately directs the incoming packet to the FP, which expects the packet to conform to one of its standards (e.g. IpoEthernet, IPoHDLC, IPoATM, etc.). However, in one scenario the packet is not IP based, but reflects an HDLC packet with a proprietary format. Thus, the FP will drop the packet because it does not recognize its form. Thus, the hardware-acceleration engine would be inoperable. Communication system 10 eliminates this problem by providing a proxy process that converts a given packet into a format that is recognizable by an FP processor.

HDLCmux represents a compression scheme that may take the payload of HDLC-based packet back-haul links (i.e. T-1) at cell site element 18 and multiplex one or more payloads together into a PPP packet (using PPPmux) that is then forwarded down another T-1 that is executing PPP. There are several compression options available depending on a number of suitable factors. One option is standard compressed UDP (cUDP). A second option is a proprietary compression protocol (cHDLC/BCN) that may be specific to HDLC/BCN framing formats. For the second option, a new PPP may be implemented to carry the specific form of a packet. Either option allows the mixing of regular IP traffic and the HDLC-based traffic on the same T-1 link. In a 2G environment, the HDLC traffic may be given higher priority over other traffic sources that are presumed to be non real-time management/control traffic.

In a simplest case of the compression algorithm, the source link (e.g. T-1) contains HDLC frames. Cell site element 18 may ignore inter-frame fill, strip off the HDLC header/tail (flag, CRC), pass the payload (including HDLC address/control) to the HDLCmux stack for compression and then PPP multiplexing, and assign a destination link tag or cross-connect ID (CCI). The PPPmux frames may be transported over the back-haul network using a PPP stack and may be mixed with other frames (e.g. IP traffic that is PPP-multiplexed). The receiving HDLCmux stack may deliver individual HDLC payloads that are then transported over the destination link by re-inserting the inter-frame fill and HDLC header/tail.

In operation of an example embodiment, the HDLCmux compression operation can be broken down into the following phases:

1) Application compression: Delineation of the HDLC payload from the HDLC framing/control (fill, flag, CRC, address, control) on a source link. Each frame from the stream may be assigned a destination link and given a CCI. A vendor-specific mapping function may be applied to the remainder of the payload in order to map the M-byte frame header to a context ID (CID) value and to remove repetitive header information.

2) Switching/routing: Based on the CCI of the frame, an output stream may be selected (e.g. a multilink point to point protocol (MLP) bundle).

3) Mixing: PPPmux packets from HDLC sources may be given higher priority (default) than PPP traffic from IP and other sources. A special PPP ID (PID) may uniquely identify HDLC multiplexed packets. Once mixed, the PPP packet may be sent to the physical/virtual interface.

4) Multiplexing: PPP payloads (i.e. from cHDLC/BCN or cUDP) destined for the same output stream may be multiplexed into one larger PPPmux packet.

5) Transmission: PPP packets (PPPmux, IP, etc.) are sent on T-1 output link (e.g. the output link may be an MLP bundle (virtual interface)).

6) Reception: PPP packets on input T-1 link (termination of the output link) may be received.

7) Separation: PPP multiplexed packets on the input link are separated from other PPP packets and given to the HDLCmux stack for processing.

8) De-multiplexing: PPP multiplexed packets may be split into one or more payloads.

9) Switching/routing: Based on the CCI of the sub-frame, the packet is sent to a particular destination link (or loop-back address).

10) Application de-compression: The M-byte HDLC/BCN header may be recreated based on the CID field and vendor-specific mapping may be applied in order to re-create the original HDLC payload. The resulting HDLC frame is encapsulated by HDLC flags and transmitted on the destination link. This effectively replicates the HDLC stream that was transmitted on the source link.

In accordance with one embodiment of the present invention, because the actual HDLC/BCN flows on a source link are not known in advance, the HDLC and BCN fields (address/control) may be mapped to a context M (CID) dynamically. In order to accomplish this, the compressor and de-compressor may maintain an assigned cM set, which is initially empty. When the compressor encounters a new HDLC/BCN header, it may send a definition field (ADD=1) in the packet with the next available cM and HDLC/BCN header. The de-compressor may store the HDLC/BCN header in the cM set and the compressor may start sending cMs instead of full HDLC/BCN headers on the next packet of that flow. The selected (e.g. vendor-specific) mapping function may be used to translate the HDLC/BCN header into a cHDLC/BCN cM and header.

With respect to provisioning considerations, the source/destination interface at the compressing/de-compressing elements may be identified by the CCI that is provisioned by the network operator. In one embodiment, it may be appropriate that eight leased lines/spans can be bundled under the same MLP virtual interface. Thus, 3-bits (in the example implementation) may be allocated to the CCI. Since it is possible that a single element can support multiple BTS types, the compression method may also be provisioned on a CCI-basis. The method of compression implies the value M. This may simplify the compressor because parameter negotiation is not necessarily required. With respect to routing data, either static routes or a routing protocol can be used to distribute the routing information to cell site element 18 and aggregation node 22.

The fields of the HDLC payload (i.e. minus the flag, CRC segments) may be identified as follows: Input HDLC/BCN packet=ADDR|CTRL|FLOW|COS|SEQ|PC|Misc|PT|Payload|. These fields may be defined as follows: ADDR: 8-bit HDLC address (one/two values per CCI/SOURCE link), CTRL: 8-bit HDLC control (typically one value per eel/source link), FLOW: 24-bit BCN flow/call ID, COS: 4-bit BCN class-of-service (typically two values per flow), SEQ: 4-bit sequence number (monotonically increases for each packet in flow) PC: 8-bit power control (random value), Misc: 4-bit miscellaneous field (random value), PT: 4-bit payload type (4-5 values corresponding to voice/date frame rate), and Payload: voice/data sample data (O-N bytes depending on PT).

The compression context and CID may be established based on the first five and one half bytes (ADDR-COS) plus the PT nibble for a total of M=6 bytes (e.g. with a hash function). The SEQ number may be transmitted with every compressed packet, but may be swapped with the PT nibble in order to save bandwidth (i.e. by changing the nibbles and then removing the 6-byte HDLC/BCN header treating the rest as the payload). The total number of CIDs per flow/callID may be 6-bits, allowing for a total of 10-bits to identify the call and CCI. The 6-byte context/header information may be hashed directly to a 16-bit cHDLC/BCN CID. Because the CCI is 3-bits, the effective number of calls supported per interface may be defined as seven bits (or 128).

The HDLCmux compression protocol (output link to input link) is a layer-two protocol (not necessarily visible to the IP layer) and may be PPP-based. The information fields for Type-I may be provided as: PPP protocol ID= (value=Type-I HDLCoPPPmux); LEN=7-bits indicating # of bytes of HDLC payload (allows a maximum of 128-byte HDLC frame [this is generally acceptable because BCN packets are smaller than ATM cells]; ADD=I-bit flag (if set, it may indicate that a BCN flow ID is being defined and a compressed BCN flow's context ID (CID) may follow, whereby the payload field may then contain the M-byte BCN header that is to be stored by the de-compressor [where M may be determined by the vendor-specific mapping function] [Note that if cleared, this may indicate that the BCN flow is compressed and the following CID may indicate the flow ID and that the payload no longer contains the M-byte BCN header, the ADD flag may be cleared (compression used) immediately (i.e. no ACK)]; CCI=3-bits indicating the source to destination cross-connect (allows a maximum of eight source T-I spans); CID=optional 13-bits indicating the BCN flow context ID (this may be derived from the HDLC/BCN header as defined by the mapping function); and Payload=LEN bytes of HDLC payload.

Figure 3:
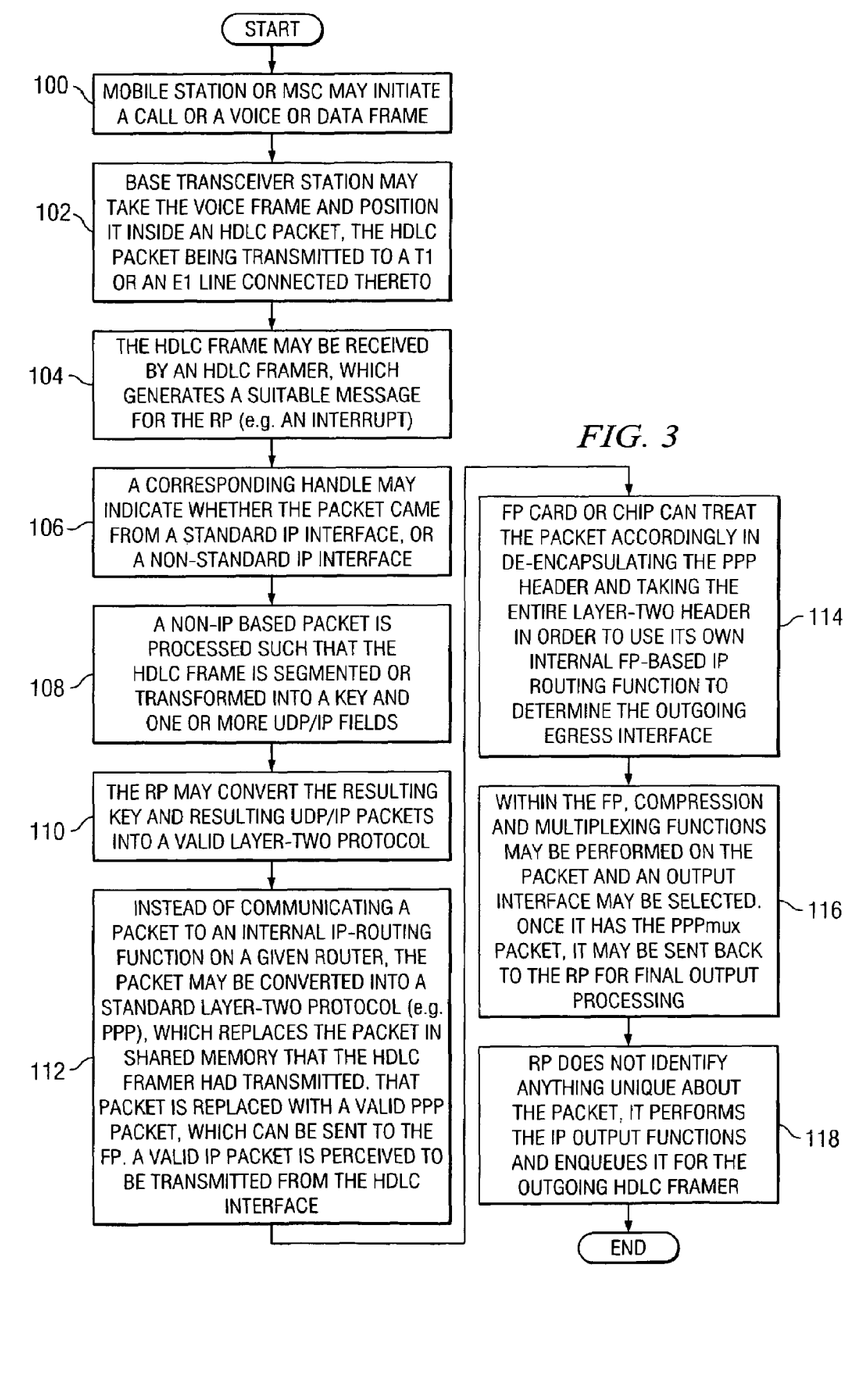
FIG. 3 is a simplified flowchart illustrating a series of example steps associated with the communication system.

FIG. 3 is a simplified flowchart illustrating a series of example steps associated with a method for compressing voice data in a communications environment. The method may begin at step 100, where mobile station 13 or MSC 25 may initiate a call or a voice or data frame. This may be translated over the air via a suitable interface. This voice frame, which may be part of an initiated communication session, may be received at base transceiver station 16. At step 102, base transceiver station 16 may take the voice frame and position it inside an HDLC packet, the HDLC packet being transmitted to a T1 or an E1 line connected thereto.

At step 104, the HDLC frame may be received by an HDLC framer, which generates a suitable message for the RP (e.g. an interrupt). A corresponding handle may indicate whether the packet came from a standard IP interface, or a non-standard IP interface at step 106. In one example, the provided format for an incoming packet is proprietary-based. Generally, the HDLC payload is extracted and identified (as a non-IP based packet) before the HDLC-specific payload compression is applied. Once this scenario is determined, at step 108, the non-IP based packet is processed such that the HDLC frame is segmented or transformed into a key and one or more UDP/IP fields. Additionally, the RP may convert the resulting key and resulting UDP/IP packets into a valid layer-two protocol at step 110.

Thus, instead of communicating a packet to an internal IP-routing function on a given router, the packet may be converted into a standard layer-two protocol (e.g. PPP), which replaces the packet in shared memory that the HDLC framer had transmitted. That packet is replaced with a valid PPP packet, which can be sent to the FP, as if it were received by the incoming HDLC interface. In a general sense, a valid IP packet is perceived to be transmitted from the HDLC interface, as reflected by step 112. The FP card or chip can treat the packet accordingly in de-encapsulating the PPP header and taking the entire layer-two header in order to use its own internal FP-based IP routing function to determine the outgoing egress interface at step 114.

Within the FP, compression and multiplexing functions may be performed on the packet and an output interface may be chosen (e.g. the WAN link backhaul link going to aggregation node 22). The selection of the outgoing interface may be done before the cUDP compression is performed. Once it has the PPPmux packet, it may be sent back to the RP for final output processing at step 116. The RP does not identify anything unique about the packet, it knows nothing of the HDLC interface, it simply performs the IP output functions and enqueues it for the outgoing HDLC framer (or whatever other output interface that was selected [i.e. the egress interface could be any standard layer-two HDLC, FR, ATM, etc.]) at step 118. Thus, a modification in the RP provides the ability to trick the FP into believing the incoming the HDLC packet that came from the media interface is a valid PPP packet, which it fully understands how to process.

With respect to the potential generation of a key and/or mapping functionality, communication system 10 may employ a number of approaches in order to achieve these operations. For example, communication system 10 may exploit a common feature of IP networks in that IP routing is generally destination-based. Thus, source address information is generally irrelevant, as is the UDP information.

These facts are recognized in using the IP address space as a key for the compressor. Hence, cell site element 18 can take the common fields and map them to a key that gets mapped into the IP source address field, as well as the UDP source and destination fields.

Once these common fields are mapped, a UDP/IP packet may be constructed, whereby the unique fields of the payload may be copied to the UDP payload field of the packet. That UDP/IP packet may be forwarded to the IP routing functionality in cell site element 18. The routing functionality of the router looks at the destination address included in the packet. The routing functionality in the router may determine the outgoing interface (e.g. a WAN link). In one embodiment, a cUDP and PPP multiplex protocol is used to compress the packet. The packet may then be transmitted over a single interface (e.g. a WAN link) and to aggregation node 22.

The reverse process may then be implemented at aggregation node 22 in order to properly decompress the packet. Thus, the packet may be demultiplexed into individual packets. For example, a cUDP decompressor may take eight or sixteen-bit context IDs and resolve them into a full UDP/IP header. This may restore the original IP source, destination, and UDP source and destination fields. This would essentially return the HDLC common payload fields from the cUDP context. Then, the unique fields may be taken from the packet. Thus, the entire HDLC frame is reconstructed, with the exception of the HDLC flag and CRC. These elements may be added on by aggregation node 22 before being transmitted to base station controller 24. Note that communication system may be used (via proxy element 26) can be used to translate from HDLC-based interfaces to either an option A format (standard cUDP/PPPmux) or an option B format (representing a specialized variant of both cUDP and PPPmux).

Some of the steps illustrated in FIG. 3 may be changed or deleted where appropriate and additional steps may also be added to the flowchart. These changes may be based on specific communication system architectures or particular networking arrangements or configurations and do not depart from the scope or the teachings of the present invention.

Although the present invention has been described in detail with reference to particular embodiments illustrated in FIGS. 1 through 3, it should be understood that various other changes, substitutions, and alterations may be made hereto without departing from the spirit or scope of the present invention. For example, although the present invention has been described with reference to a number of elements included within communication system 10, these elements may be rearranged or positioned in order to accommodate any suitable routing architectures. In addition, any of these elements may be provided as separate external components to communication system 10 or to each other where appropriate. The present invention contemplates great flexibility in the arrangement of these elements as well as their internal structure and configuration.

In addition, although the preceding description offers a compression protocol to be implemented with particular devices (e.g. aggregation node 22 and cell site element 18), the compression protocol provided may be embodied in a fabricated module that is designed specifically for effectuating the compression techniques as identified above. Moreover, such a module may be compatible with any appropriate protocol other than the described platforms, which were offered for purposes of teaching and example only.

Additionally, although numerous example embodiments provided above reference voice data, communication system 10 may cooperate with any other type of data in which compression protocols are applicable. For example, normative or standard data, video data, and audio-visual data may benefit from the teachings of the present invention. Communication system 10 is malleable and adaptive in that it may be used in conjunction with any information that is sought to be compressed in a communications environment. It is also critical to note that the use of the terms 'aggregation node' and 'cell site element' herein in this document only connotes an example representation of one or more elements associated with base transceiver station 16 and base station controller 24. These terms have been offered for purposes of example and teaching only and do not necessarily imply any particular architecture or configuration. Moreover, the terms 'cell site element' and 'aggregation node' are intended to encompass any network element operable to facilitate a data exchange in a network environment. Accordingly, cell site element 18 and aggregation node 22 may be routers, switches, bridges, gateways, interfaces, or any other suitable module, device, component, element or object operable to effectuate one or more of the operations, tasks, or functionalities associated with compressing data as implied, described, or offered herein.

Numerous other changes, substitutions, variations, alterations, and modifications may be ascertained to one skilled in the art and it is intended that the present invention encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this invention in any way that is not otherwise reflected in the appended claims.

What is claimed is:

1. An apparatus for compressing data, comprising:
a cell site element associated with a base transceiver station and operable to receive a communications flow communicated by a mobile station, the cell site element including a route processor (RP) and a forwarding path (FP) element, wherein the RP is operable to communicate with a proxy element in order to determine if an incoming packet is associated with an internet protocol (IP) such that, in cases where the incoming packet is non-IP based, the proxy element performs a mapping between a non-IP based protocol associated with the incoming packet and an IP protocol in order to generate an IP compatible packet to be processed by the FP element and communicated to a next destination, wherein the cell site element is operable to extract a high-level data link control (HDLC) payload from the packet and to perform a compression process on the HDLC payload in order to reduce a number of bytes associated with the incoming packet, the cell site element being further operable to build a key that maps the HDLC payload associated with the packet to the key, the key being broken into segments that are positioned into a selected one or more of a source internet protocol (IP) address field, a user datagram protocol (UDP) source port field, and a UDP destination port field of a UDP packet, the UDP packet being sent to the RP of the cell site element such that it may be directed to a next destination.

2. The apparatus of claim 1, wherein the mapping performed by the proxy element operates to add a selected one or more of a point to point (PPP) header, an IP header, and a user datagram protocol (UDP) header to one or more frames of the incoming packet.

3. The apparatus of claim 2, wherein one or more fields of the incoming packet may be mapped to one or more fields of a UDP/IP header.

4. The apparatus of claim 2, wherein the proxy element is operable to remove one or more of the PPP header, the IP header, and the UDP header from one or more of the frames before communicating one or more of the frames to a media interface.

5. The apparatus of claim 1, wherein the FP element is an acceleration engine operable to process IP communication flows in order to provide a selected one or more of routing operations, quality of service operations, compression operations, and fast-switching operations.

6. The apparatus of claim 1, wherein the cell site element is operable to construct the UDP packet, and wherein remaining fields of the HDLC payload may be copied and positioned into a payload field of the UDP packet.

7. The apparatus of claim 1, further comprising:
an aggregation node associated with a base station controller and operable to receive a point to point protocol (PPP) over HDLC packet that corresponds to the UDP packet from the cell site element.

8. The apparatus of claim 1, wherein the FP processes the IP compatible packet and then returns it to the RP such that it may be communicated over an outgoing interface to a next destination.

9. A method for compressing data, comprising:
receiving, at a cell site element, a communications flow communicated by a mobile station;
communicating with a proxy element in order to determine if an incoming packet is associated with an internet protocol (IP); and
performing a mapping between a non-IP based protocol associated with the incoming packet and an IP protocol in cases where the incoming packet is non-IP based in order to generate an IP compatible packet to be processed by a forwarding path element and communicated to a next destination, wherein the cell site element is operable to extract a high-level data link control (HDLC) payload from the packet and to perform a compression process on the HDLC payload in order to reduce a number of bytes associated with the incoming packet, the cell site element being further operable to build a key that maps the HDLC payload associated with the packet to the key, the key being broken into segments that are positioned into a selected one or more of a source internet protocol (IP) address field, a user datagram protocol (UDP) source port field, and a UDP destination port field of a UDP packet, the UDP packet being sent to the RP of the cell site element such that it may be directed to a next destination.

10. The method of claim 9, wherein the mapping performed operates to add a selected one or more of a point to point (PPP) header, an IP header, and a user datagram protocol (UDP) header to one or more frames of the incoming packet.

11. The method of claim 10, wherein one or more fields of the incoming packet may be mapped to one or more fields of a UDP/IP header.

12. The method of claim 10, further comprising:
removing one or more of the PPP header, the IP header, and the UDP header from one or more of the frames before communicating one or more of the frames to a media interface.

13. The method of claim 10, wherein the FP element is an acceleration engine operable to process IP communication flows in order to provide a selected one or more of routing operations, quality of service operations, compression operations, and fast-switching operations.

14. The method of claim 9, further comprising:
receiving a point to point protocol (PPP) over HDLC packet that corresponds to a UDP packet associated with the incoming packet.

15. The method of claim 9, further comprising:
processing the IP compatible packet; and
returning the IP compatible packet to a route processor (RP) such that it may be communicated over an outgoing interface to a next destination.

16. A system for compressing data, comprising:
means for receiving a communications flow communicated by a mobile station;
means for communicating with a proxy element in order to determine if an incoming packet is associated with an internet protocol (IP); and
means for performing a mapping between a non-IP based protocol associated with the incoming packet and an IP protocol in cases where the incoming packet is non-IP based in order to generate an IP compatible packet to be processed by a forwarding path element and communicated to a next destination, wherein the means for receiving is operable to extract a high-level data link control (HDLC) payload from the packet and to perform a compression process on the HDLC payload in order to reduce a number of bytes associated with the incoming packet, the means for receiving being further operable to build a key that maps the HDLC payload associated with the packet to the keys the key being broken into segments that are positioned into a selected one or more of a source internet protocol (IP) address field, a user datagram protocol (UDP) source port field, and a UDP destination port field of a UDP packet, the UDP packet being sent to a processor of the means for receiving such that it may be directed to a next destination.

17. The system of claim 16, wherein the mapping performed operates to add a selected one or more of a point to point (PPP) header, an IP header, and a user datagram protocol (UDP) header to one or more frames of the incoming packet.

18. The system of claim 17, wherein one or more fields of the incoming packet may be mapped to one or more fields of a UDP/IP header.

19. The system of claim 17, further comprising:
means for removing one or more of the PPP header, the IP header, and the UDP header from one or more of the frames before communicating one or more of the frames to a media interface.

20. The system of claim 17, further comprising:
means for receiving a point to point protocol (PPP) over HDLC packet that corresponds to a UDP packet associated with the incoming packet.

21. The system of claim 17, further comprising:
means for processing the IP compatible packet; and
means for returning the IP compatible packet to a route processor (RP) such that it may be communicated over an outgoing interface to a next destination.

22. A computer readable medium comprising a code for compressing data such that when the code is executed is operable to:
receive, at a cell site element a communications flow communicated by a mobile station;
communicate with a proxy element in order to determine if an incoming packet is associated with an internet protocol (IP); and
perform a mapping between a non-IP based protocol associated with the incoming packet and an IP protocol in cases where the incoming packet is non-IP based in order to generate an IP compatible packet to be processed by a forwarding path element and communicated to a next destination, wherein the means for receiving is operable to extract a high-level data link control (HDLC) payload from the packet and to perform a compression process on the HDLC payload in order to reduce a number of bytes associated with the incoming packet the means for receiving being further operable to build a key that maps the HDLC payload associated with the packet to the key, the key being broken into segments that are positioned into a selected one or more of a source internet protocol (IP) address field, a user datagram protocol (UDP) source port field~ and a UDP destination port field of a UDP packet the UDP packet being sent to the RP of the means for receiving such that it may be directed to a next destination.

23. The medium of claim 22, wherein the mapping performed operates to add a selected one or more of a point to point (PPP) header, an IP header, and a user datagram protocol (UDP) header to one or more frames of the incoming packet.

24. The medium of claim 23, wherein one or more fields of the incoming packet may be mapped to one or more fields of a UDP/IP header.

25. The medium of claim 23, wherein the code is further operable to:
remove one or more of the PPP header, the IP header, and the UDP header from one or more of the frames before communicating one or more of the frames to a media interface.

26. The medium of claim 23, wherein the code is further operable to:
receive a point to point protocol (PPP) over HDLC packet that corresponds to a UDP packet associated with the incoming packet.

27. The medium of claim 23, wherein the code is further operable to:
process the IP compatible packet; and
return the IP compatible packet to a route processor (RP) such that it may be communicated over an outgoing interface to a next destination.

* * * * *